3,576,011
TETRAHYDROPYRAN PRODUCTION
Peter Haynes, 433 Michigan Ave.,
Berkeley, Calif. 94707
No Drawing. Filed Oct. 28, 1968, Ser. No. 771,368
Int. Cl. C07d 7/04
U.S. Cl. 260—345.1                 10 Claims

ABSTRACT OF THE DISCLOSURE

Dialkenyl-substituted tetrahydropyran compounds, useful in perfume compositions and as solvents, are produced by contacting conjugated diolefinic compounds and formaldehyde in the presence of an organophosphine-containing palladium(O) complex.

BACKGROUND OF THE INVENTION

A variety of methods are known for preparing pyran compounds. One well known reaction is the Prins reaction wherein butadiene and formaldehyde are contacted in the presence of acid catalysts to produce dihydropyran as well as several vinyldioxane compounds as depicted in Equation 1:

$$CH_2=CH-CH=CH_2 + CH_2O \xrightarrow{H^+}$$

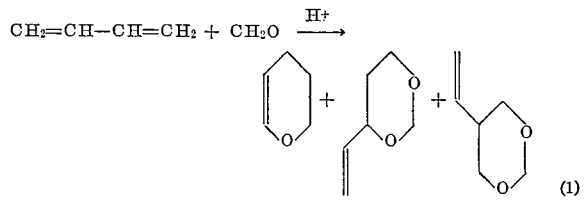

(1)

SUMMARY OF THE INVENTION

It has now been found that dialkenyl-substituted tetrahydropyran compounds are produced by contacting a conjugated olefinic compound and formaldehyde in the presence of an organophosphine-containing palladium-(O) compound as catalyst. By way of illustration, the reaction of butadiene and formaldehyde in the presence of catalytic amounts of tetrakis(triphenylphosphine)palladium(O) produces a mixture comprising 2,5-divinyltetrahydropyran and 3,5-divinyltetrahydropyran.

DESCRIPTION OF PREFERRED EMBODIMENT

The formaldehyde reactant

The formaldehyde reactant employed in the process of the invention is suitably introduced in the pure form or produced in situ, e.g., from paraformaldehyde. However, in the preferred modification of the process, the formaldehyde is introduced as an aqueous solution. Such aqueous solutions of formaldehyde are commercially available and any grade of reasonable purity is generally satisfactory.

Conjugated olefinic reactant

The process of the invention is broadly applicable to reaction of formaldehyde with any olefinic compound having two conjugated ethylenic linkages wherein at least three carbon atoms of the two conjugated ethylenic linkages have at least one hydrogen substituent. One class of suitable conjugated olefinic reactants are conjugated olefinic hydrocarbons having from 4 to 8 carbon atoms and represented by the Formula 2

$$RCH=CH-\underset{R}{C}=CHR \qquad (2)$$

wherein R independently is hydrogen, alkyl of 1 to 4 carbon atoms or alkenyl of 1 to 4 carbon atoms, with the proviso that the ethylenic unsaturation of any alkenyl group is non-conjugated with the ethylenic linkages depicted in Formula 2. Illustrative olefins of Formula 2 therefore include butadiene, isoprene, 1,3-pentadiene, 3-methyl-1,3-pentadiene, 1,3-hexadiene, 2,4-hexadiene, 2-ethylbutadiene, 1,3-heptadiene, 1,3-octadiene, 1,3,6-octatriene and 1,3,7-octatriene. Preferred conjugated olefinic reactants are those having at least one terminal conjugated ethylenic linkage, i.e., conjugated α-olefins such as butadiene, isoprene and 1,3-pentadiene.

The mole ratio of olefinic reactant to formaldehyde is not critical, although it is generally desirable to employ substantially stoichiometric amounts of the olefinic reactant and formaldehyde, i.e., about 2 moles of olefinic reactant per mole of formaldehyde. However, mole ratios of olefinic reactant to formaldehyde of from about 5:1 to about 1:5 are satisfactory with mole ratios of about 3:1 to about 1:3 being preferred.

The catalyst

The catalyst employed in the process of the invention is palladium complexed with tertiary phosphine. Without wishing to be bound by any particular theory, it appears that the chemical transformation during the course of the reaction which involves the catalyst is quite complex; however, it is believed that the actual catalyst species may be a palladium zero-valent complex associated with tertiary phosphine and the conjugated olefinic reactant. Although any organophosphine-containing palladium zero-valent complex additionally containing ligands such as carbon monoxide and tertiary organoarsines and the like is operable, the catalyst is preferably introduced or produced in situ in the form of a tris(tertiary organophosphine)palladium(O) or a tetrakis (tertiary organophosphine) palladium(O), which compounds are prepared and described by L. Malatesta and M. Angoletta, J. Chem. Soc., 1186 (1957). Such complexes are represented by the Formulas 3 and 4.

$$(R'_3P)_3PD \qquad (3)$$

and $$(R'_3P)_4Pd \qquad (4)$$

wherein $R'_3P$ is a tertiary organophosphine and $R'$ independently is an organo group of from 1 to 20 carbon atoms, preferably 1 to 10 carbon atoms, and free from acetylenic unsaturation, with the proviso that the $R'$ groups may together with the phosphorus atom form a mono- or bicyclic heterocyclic phosphine having from 5 to 7 atoms in the ring thereof.

The $R'$ group is saturated aliphatic, including cycloaliphatic, or is aromatic in character, preferably mononuclear (mono-carbocyclic) aromatic, and is hydrocarbyl, that is, contains only atoms of carbon and hydrogen, or is substituted-hydrocarbyl containing, besides atoms of carbon and hydrogen, other atoms such as oxygen, sulfur, nitrogen and halogen, particularly halogen of atomic number from 9 to 35 inclusive, which atoms are present in functional groups such as alkoxy, aryloxy, carboalkoxy, acyl, trihalomethyl, halo, cyano, dialkylamino, sulfonylalkyl, alkanoyloxy, and like groups having no active hydrogen atoms. A preferred class of nonhydrocarbyl substituents comprises an atom having atomic number from 7 to 8, i.e., nitrogen or oxygen, one valence of which is satisfied by bonding to an otherwise hydrocarbyl $R'$ substituent, and the remaining valence(s) are satisfied by bonding to lower alkyl radicals of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic $R'$ groups are hydrocarbyl $R'$ groups such as methyl, ethyl, propyl, isopropyl, butyl, isooctyl, decyl, lauryl, stearyl, cyclohexyl, cyclopentyl, 3,4-dimethy-cyclopentyl, cyclooctyl, benzyl and β-phenylethyl; as well as substituted groups such as 4-bromohexyl, methoxymethyl, 3-(diethylamino)propyl, 4-carbethoxybutyl, and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p - carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

In the $R'_3P$ component as defined above, the $R'$ moieties are the same or different. Exemplary $R'_3P$ groups include phosphines such as tributylphosphine, triphenylphosphine, tris(4-methoxyphenyl) phosphine, tris(4-tolyl)-phosphine, tris(3 - chlorophenyl)phosphine, tris(4 - dimethylaminophenyl)phosphine, hexyldiphenylphosphine, dimethyl(3-methoxyphenyl)phosphine, dibutylphenyl - phosphine, methyldiphenylphosphine, butyldiphenyl - phosphine, n-decyldiphenylphosphine and the like.

Exemplary monocyclic and bicyclic tertiary phosphines wherein two $R'$ groups are joined to form heterocyclic rings are discolsed by Maier "Progress in Inorganic Chemistry," vol. 5, F. A. Cotton, ed., Interscience Publishers, N.Y., 1963; F. G. Mann, "Progress in Organic Chemistry," vol. 4, F. W. Cook, ed., Butterworths, London, 1958; F. G. Mann et al., J. Chem. Soc. 1130 (1953), and U.S. 3,400,163 of Mason et al., issued Sept. 3, 1968 and the disclosures of these publications are herewith incorporated by reference.

In general, phosphine components wherein the phosphorus substituents are wholly aromatic are preferred over those in which the substituents are wholly aliphatic or a mixture of aromatic and aliphatic. In the palladium complexes represented by the Formulas 3 and 4, the tertiary organophosphine components are the same or different. Largely because of economic reasons, tetrakis-(triphenylphosphine)palladium(O) is a particularly preferred palladium catalyst.

The process of the invention is characterized by the requirement for only catalytic quantities of the palladium compound. In most instances, amounts of palladium compound from about 0.1% by weight to about 10% by weight based on olefinic reactant are satisfactory although amounts of palladium compound from about 1% by weight to about 5% by weight on the same basis are preferred.

Reaction conditions

The process of the invention is conducted in the liquid phase in the presence of a diluent which is liquid at reaction temperature and pressure and is inert to the reactants and products produced therefrom. Suitable diluents are hydrocarbons and halohydrocarbons free from aliphatic unsaturation such as hexane, heptane, octane, decane, dodecane, cyclohexane, tetrahydronaphthalene, benzene, toluene, xylene, chlorobenzene, and bromobenzene. In general, amounts of diluent from about 5 moles to about 20 moles per mole olefin are satisfactory. When formaldehyde is employed in the process as an aqueous solution, the water may serve as a portion of the diluent. The process is preferably conducted in an inert reaction environment so that the presence of reactive materials such as oxygen is desirably avoided. Suitable reaction conditions are therefore substantially oxygen-free.

A variety of procedures can be employed for contacting the reaction components with the catalyst. In one modification, the entire amounts of the olefinic reactant, formaldehyde, diluent and catalyst are charged to an autoclave or similar pressure reactor and maintained at reaction conditions for the desired reaction period. In another modification, one reaction component is added to the other reaction components in increments, as by adding the formaldehyde to a solution of the olefinic reactant and catalyst. By any modification, the process is most efficiently conducted at elevated temperature and pressure. In general, temperatures varying from about 40° C. to about 150° C. are satisfactory with temperature from about 60° C. to 120° C. being preferred. Suitable reaction pressures are those which serve to maintain the reaction mixture substantially in the liquid phase. Reaction pressures from about 1 atmosphere to about 50 atmospheres in general are satisfactory although autogenous pressure, that is, the pressure generated by the reaction mixture when maintained at reaction temperature in a sealed reaction system, is preferred.

At the conclusion of reaction, the product mixture is separated and the tetrahydropyran product is recovered by conventional methods such as fractional distillation, selective extraction and the like.

The tetrahydropyran products

According to the process of the invention two molecules of the conjugated diolefin and one molecule of formaldehyde are converted to a dialkenyl-substituted tetrahydropyran compound. In terms of the olefin reactant of Formula 2, the tetrahydropyran compound is represented by the Formulas 5 and 6

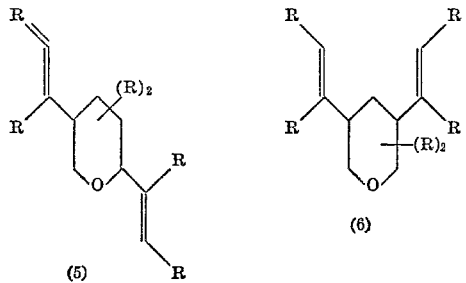

wherein R has the same significance as previously defined for the olefin of Formula 2 and wherein the total number of carbon atoms is from 9 to 17 inclusive, which number of carbon atoms equals the sum of the carbon atoms of two molecules of the olefinic reactant of Formula 2 and one molecule of formaldehyde. By way of illustration, the reaction of butadiene and formaldehyde produces a product mixture represented by Formulas 7 and 8

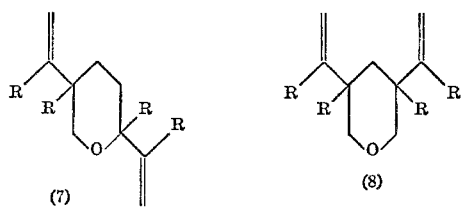

wherein R is hydrogen, e.g., 2,5-divinyltetrahydropyran and 3,5-divinyltetrahydropyran. Similarly, the reaction of isoprene and formaldehyde produces a mixture of dimethyl-substituted divinyltetrahydropyrans represented by Formulas 7 and 8 wherein two R groups are hydrogen and two R groups are methyl, e.g., 3,5-diisopropenyltetrahydropyran, 2,5-diisopropenyltetrahydropyran, 3-vinyl-3-methyl-5-isopropenyltetrahydropyran, 5-vinyl-5-methyl-3-isopropenyltetrahydropyran, 2-vinyl-2-methyl - 5 - isopropenyltetrahydropyran, 5 - vinyl-5-methyl-2-isopropenyltetrahydropyran, 3,5-dimethyl - 3,5 - divinyltetrahydropyran and/or 2,5-dimethyl-2,5-divinyltetrahydropyran.

The dialkenyl-substituted tetrahydropyran products of the invention have utility as solvents as they are miscible with a variety of substances such as alcohols, ketones, esters, ethers and hydrocarbons. The tetrahydropyran compounds of the invention have the same general solvent properties as tetrahydropyran and are therefore useful in many applications employing tetrahydropyran, for example, as a reaction medium for Grignard and metal hydride reactions and as a solvent for higher polymers, particularly polyvinylchloride. However, the higher boiling point of the dialkenyl-substituted tetrahydropyrans of the invention is often of added advantage since it allows solubilization of a greater quantity of material, and hence the use of less solvent with a corresponding decrease in operational costs. Moreover, the dialkenyl-substituted tetrahydropyrans are readily hydrogenated in the presence of transition metal catalysts, e.g., Raney nickel, to give alkyl-substituted tetrahydropyrans which also possess the general solvent properties of tetrahydropyran.

In addition to utility as solvents, the olefinically unsaturated tetrahydropyran products of the invention possess a refreshing floral odor. For example, the divinyltetrahydropyran products possess a floral odor of a minty character which is useful in a wide range of perfumes of floral- to herb-cologne blends. The odoriferous properties of olefinically unsaturated tetrahydropyrans is recognized in the perfumery art, for example, U.S. 3,161,657 of Eschenmoser et al., issued Dec. 15, 1964, discloses the floral odors of 2-(2-methyl-1-propen-1-yl)-4-methyltetrahydropyran.

To further illustrate the improved process of the invention and the novel products produced thereby, the following examples are provided. It should be understood that the details thereof are not to be regarded as limitations as they may be varied, as will be understood by one skilled in the art.

EXAMPLE I

A mixture of 3 g. of butadiene, 3 g. of a 30% wt. aqueous formaldehyde solution, 0.25 g. of tetrakis(triphenylphosphine)palladium(O) and 10 ml. of benzene was charged to a 80-ml. stainless-steel autoclave. The autoclave was maintained at a temperature of 80° C. for about 17 hours. The autoclave was then cooled, and the reaction mixture, composed of a benzene phase and a water phase, was recovered. The benzene phase was separated, dried over magnesium sulfate and distilled to give 2.6 g. of a product mixture (B.P. 51° C. at 3 mm.) consisting of 64% 2,5-divinyltetrahydropyran and 36% 3,5-divinyltetrahydropyran. The conversion of butadiene was 67% and the selectivity to divinyltetrahydropyrans was 95%. Elemental analysis of the divinyltetrahydropyran product mixture gave the following results:

Calcd. for $C_9H_{14}O$ (percent wt.): C, 78.2; H, 10.2; O, 11.6. Found (percent wt.): C, 78.1; H, 10.4; O, 11.5.

A sample of the divinyltetrahydropyran product mixture was separated into the 2,5-divinyltetrahydropyran isomer and the 3,5-divinyltetrahydropyran isomer by gas-liquid chromatography.

Examination of the 2,5-divinyltetrahydropyran by infrared spectroscopy indicated bands at 6.09μ, 5.43μ, 3.25μ, 7.03μ, and 9μ. The infrared spectrum of 3,5-divinyltetrahydropyran was extremely similar with minor differences only in the fingerprint region. Mass spectroscopic and nuclear magnetic resonance spectroscopic analyses were consistent with the divinyltetrahydropyranyl structure.

EXAMPLE II

By a procedure similar to that of Example I, a mixture of 3 g. isoprene, 6 g. of 30% wt. aqueous formaldehyde, 0.25 g. of tetrakis(triphenylphosphine)palladium and 10 ml. of benzene was contacted at a temperature of 80° C. for 17 hours. A good yield of vinyl-substituted and isopropenyl-substituted tetrahydropyrans was obtained. Infrared analysis of the tetrahydropyran product mixture showed a band of 9.05μ (ether linkage) and a band at 6.10μ (olefinic linkage).

EXAMPLE III

A fancy perfume composition of a floral type is prepared by mixing the ingredients set forth hereinafter.

| Ingredient: | Parts by weight |
|---|---|
| Mixture of divinyltetrahydropyrans prepared as described in Example I | 35 |
| Rhodinol | 180 |
| Phenylethyl alcohol | 120 |
| Linalool | 40 |
| Dimethylacetal of phenylacetaldehyde | 30 |
| Amyl cinnamic aldehyde | 30 |
| Benzyl acetate | 90 |
| Hydroxycitronellal | 150 |
| Methylionone | 60 |
| Heliotropine | 30 |
| Musk ambrette | 10 |
| Musk ketone | 40 |
| Vanillin | 15 |
| Eugenol | 15 |
| Benzyl salicylate | 25 |
| Bergamot oil | 50 |
| Ylang oil | 30 |
| Neroli bigarde oil | 10 |
| Santalol | 20 |
| | 1000 |

I claim as my invention:

1. A process for producing tetrahydropyran compounds from the elements of formaldehyde and two molecules of an olefinic hydrocarbon having two conjugated ethylenic linkages and having from 4 to 8 carbon atoms, which comprises reacting in the liquid phase formaldehyde and said olefinic hydrocarbon in the presence of a catalytic amount of a zero-valent palladium compound represented by the formula $(R'_3P)_3Pd$ or $(R'_3P)_4Pd$ wherein R' independently is a hydrocarbyl group of from 1 to 20 carbon atoms selected from saturated aliphatic, saturated cycloaliphatic and mononuclear aromatic, at a temperature of from about 40° C. to about 150° C.

2. The process of claim 1 wherein the molar ratio of olefinic hydrocarbon to formaldehyde is from about 5:1 to about 1:5 and the amount of palladium compound is from about 0.1% wt. to about 10% wt. based on diolefin.

3. The process of claim 2 wherein at least one of the conjugated ethylenic linkages is terminal.

4. The process of claim 3 wherein R' is mononuclear aromatic.

5. The process of claim 4 wherein the palladium compound is tetrakis(triphenylphosphine)palladium.

6. The process of claim 5 wherein the olefinic hydrocarbon is butadiene.

7. The process of claim 5 wherein the olefinic hydrocarbon is isoprene.

8. Tetrahydropyrans of from 9 to 11 carbon atoms and of the formulas

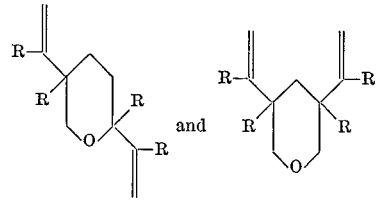

wherein R is hydrogen or methyl.

9. Tetrahydropyrans of claim 8 wherein two R groups are methyl and two R groups are hydrogen.

10. Tetrahydropyrans of claim 8 wherein R is hydrogen.

References Cited

UNITED STATES PATENTS 3,161,657  12/1964  Eschenmoser et al. __ 260—345.1
3,414,588  12/1968  Jones _____ 260—345.1X JOHN M. FORD, Primary Examiner U.S. Cl. X.R.

252—522; 260—340.7

PO-1050
(5/69)

UNITED STATES PATENT OFFICE
CERTIFICATE OF CORRECTION

Patent No. 3,576,011               Dated  April 20, 1971

Inventor(s)    Peter Haynes

It is certified that error appears in the above-identified patent and that said Letters Patent are hereby corrected as shown below:

> Column 1, line 3, after "Calif." insert -- , assignor to Shell Oil Company, New York, New York, a Delaware Corporation --.
>
> Signed and sealed this 24th day of August 1971.

(SEAL)
Attest:

EDWARD M. FLETCHER, JR.                WILLIAM E. SCHUYLER, JR.
Attesting Officer                       Commissioner of Patents